Figure 1:
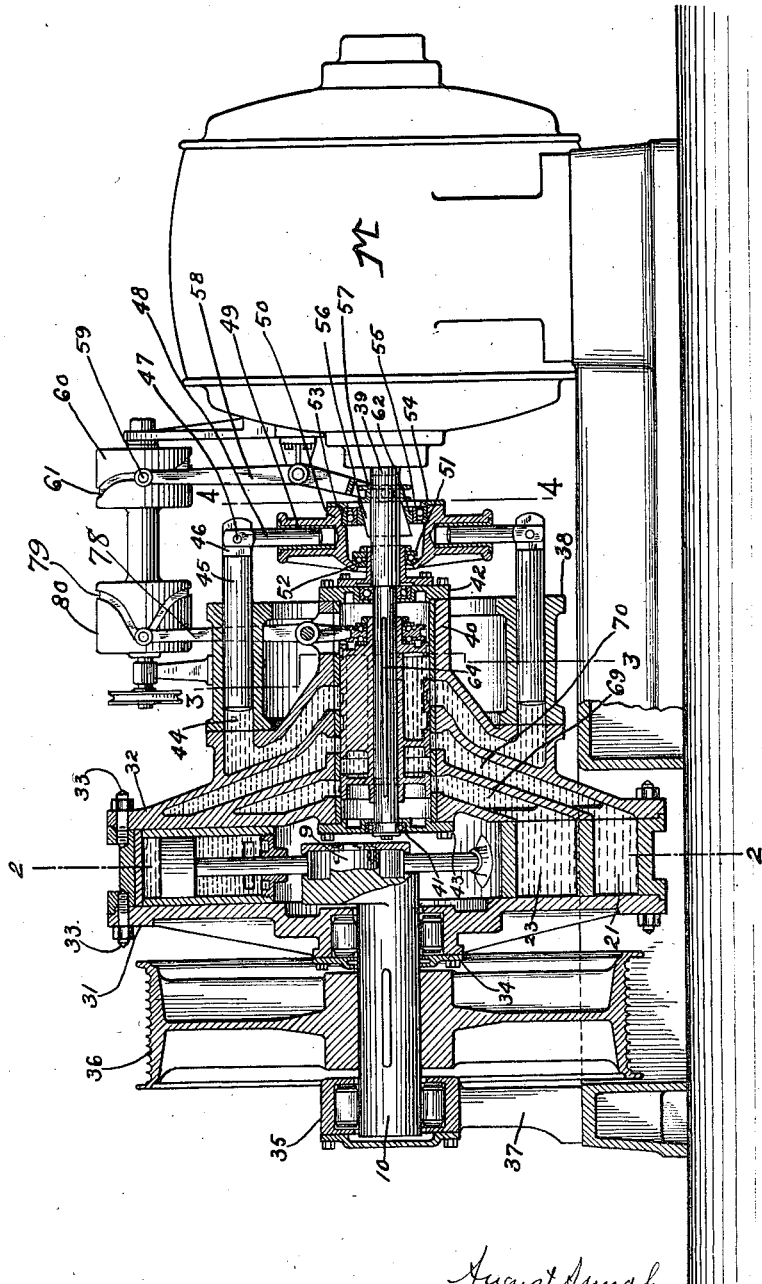

A. SUNDH.
POWER TRANSMISSION DEVICE.
APPLICATION FILED MAY 2, 1913.

1,256,949.

Patented Feb. 19, 1918.
4 SHEETS—SHEET 1.

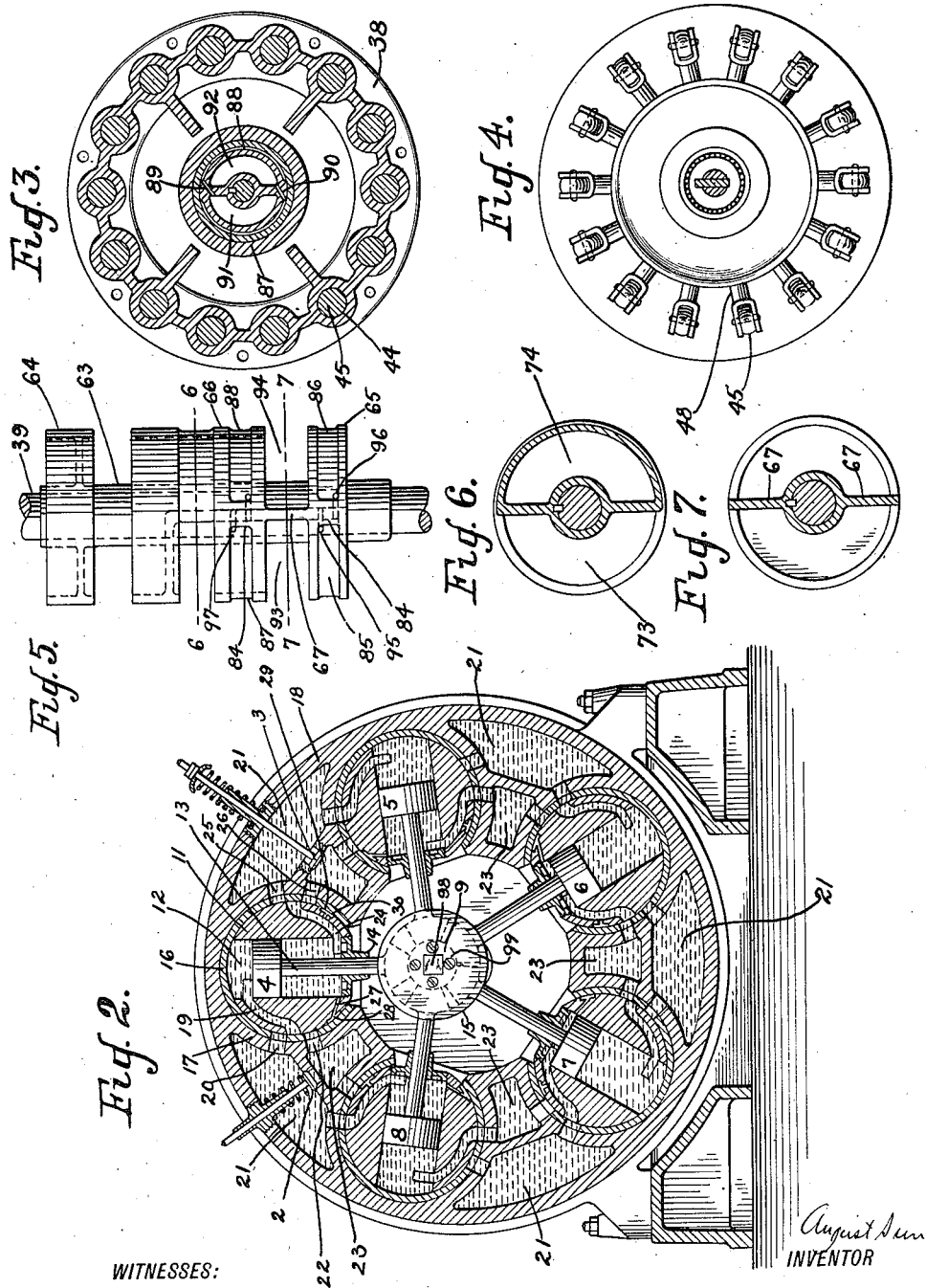

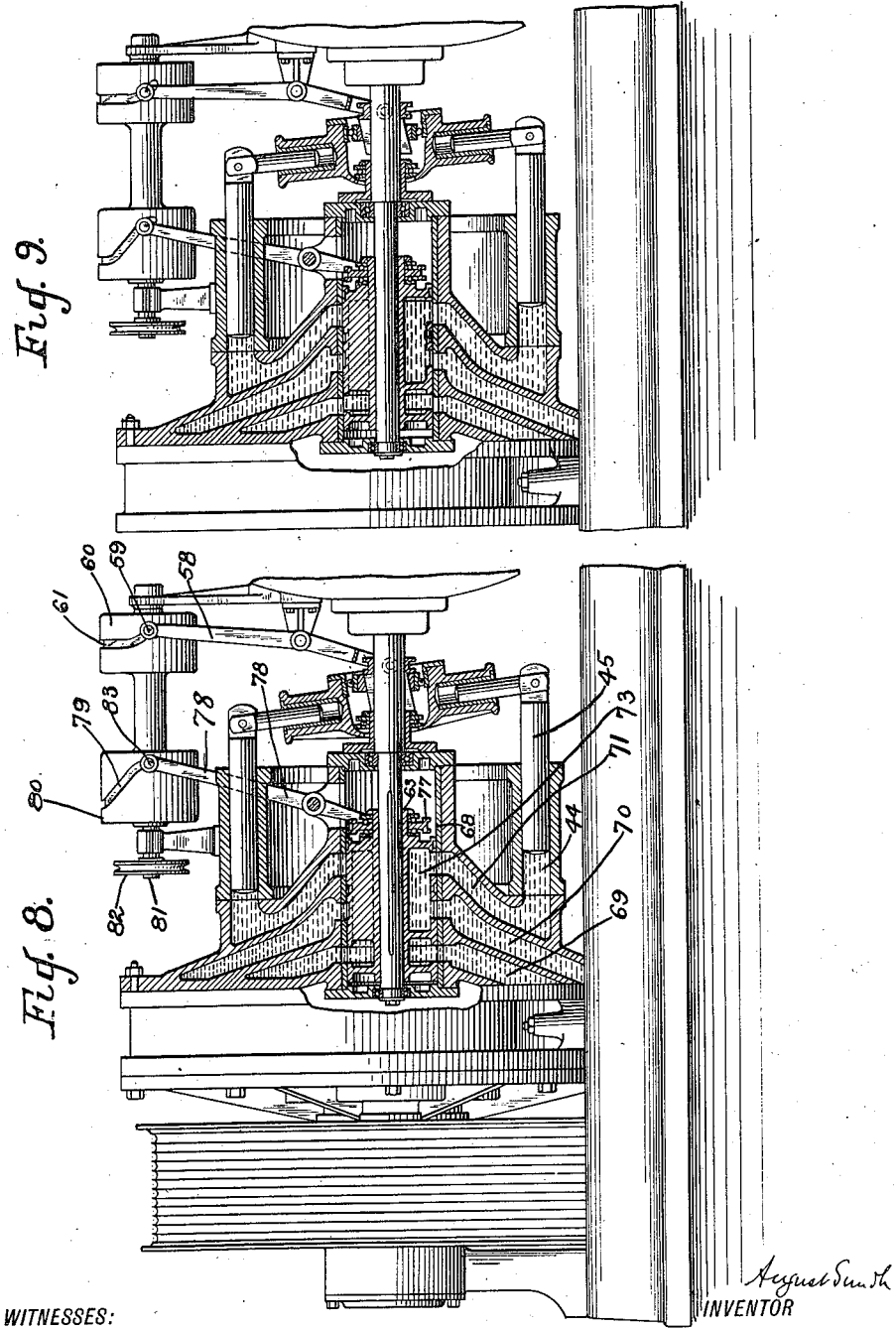

A. SUNDH.
POWER TRANSMISSION DEVICE.
APPLICATION FILED MAY 2, 1913.
1,256,949.
Patented Feb. 19, 1918.
4 SHEETS—SHEET 4.
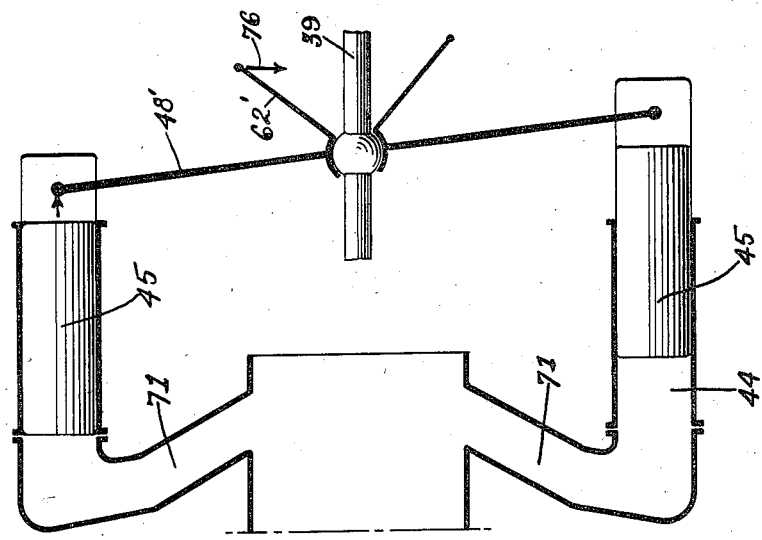
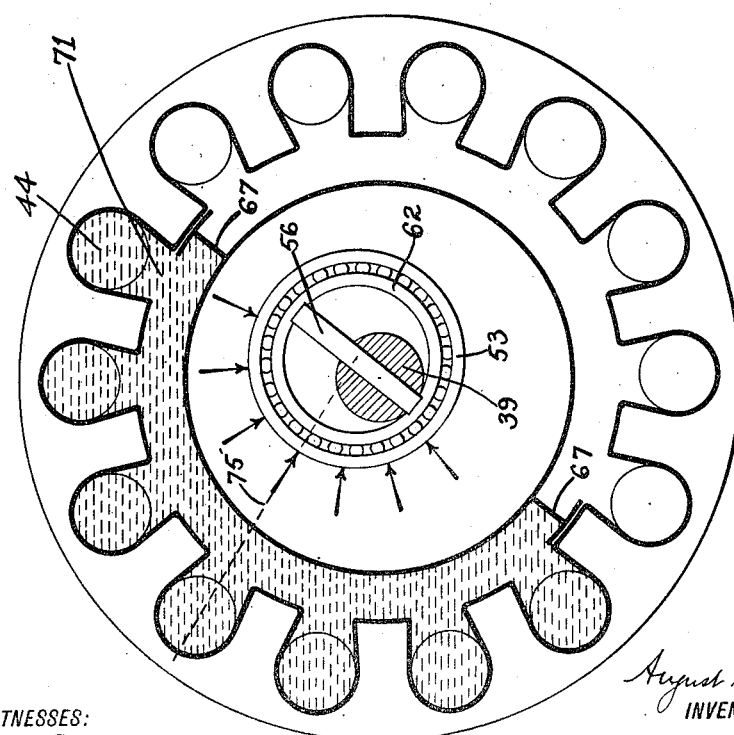
WITNESSES:
Arthur Trizise Jr.
James G. Bethell.
August Sundh
INVENTOR
BY
L. K. Campbell
ATTORNEY

UNITED STATES PATENT OFFICE.

AUGUST SUNDH, OF HASTINGS-UPON-HUDSON, NEW YORK, ASSIGNOR TO OTIS ELEVATOR COMPANY, A CORPORATION OF NEW JERSEY.

POWER-TRANSMISSION DEVICE.

1,256,949.     Specification of Letters Patent.     Patented Feb. 19, 1918.

Application filed May 2, 1913. Serial No. 764,994.

*To all whom it may concern:*

Be it known that I, AUGUST SUNDH, a citizen of the United States, residing in Hastings-upon-Hudson, in the county of Westchester and State of New York, have invented a new and useful Improvement in Power-Transmission Devices, of which the following is a specification.

My invention relates to mechanism for transmitting power by fluid pressure from a driving member to a driven member, and comprises means for effecting a variation in the speed and torque of the driven member in either direction of rotation.

The invention further comprises the combination of a pump adapted to be operated by any desired prime mover or other driving elements, and a motor driven by fluid supplied from the pump, the motor being operatively connected to any mechanism that it is desired to operate.

An object of the invention is to provide simple, practical and extremely efficient power transmission mechanism of the character above indicated, and in which the transmission may be controlled with ease and certainty throughout its entire range of speed and torque from a distant point and without danger of damage to the mechanism from a too sudden operation of the controlling device.

A further object of the invention is the provision of a fluid power transmission mechanism in which a plurality of reciprocating plungers or pistons are used in both the pump and motor mechanisms, the arrangement being such that power may be transmitted from a driving element to a driven element with uniform torque and without the slightest evidence of vibration, which feature is of great practical importance where the driven member is sometimes required to operate at slow speeds, such for example as the driven element or cable sheave of a rope drive traction elevator.

Other objects of the invention will appear hereinafter, the novel combinations of elements being pointed out in the appended claims.

The present invention is a modification of the invention disclosed in my co-pending application, Ser. No. 759,601, for fluid motor pump, filed April 8, 1913, and my co-pending application Serial No. 762,215, for fluid motor or pump, filed April 19, 1913.

In the accompanying drawings, Figure 1 is a sectional elevation view of a fluid power transmission mechanism containing an embodiment of my invention; Figs. 2, 3 and 4 are end sectional views of Fig. 1 taken on the lines 2—2, 3—3, and 4—4, respectively, of Fig. 1; Fig. 5 shows the valve; Figs. 6 and 7 are sections of the valve taken on the lines 6—6 and 7—7, respectively of Fig. 5; Figs. 8 and 9 are views similar to Fig. 1 and showing the pump and valve apparatus in different operative positions; Figs. 10 and 11 are diagrammatic views showing the operation of the pump.

Like reference characters denote similar parts in all of the figures.

Referring to Figs. 1 and 2, I will first describe the fluid pressure motor or engine. The same is substantially like that disclosed in my aforesaid co-pending application, Serial No. 759,601, and comprises a single unit consisting of a plurality of double acting cylinders whose pistons 4, 5, 6, 7 and 8 are connected to a common crank pin 9, secured to, or formed integral with a single throw crank shaft 10. For purposes of illustration, I have shown but one unit of five cylinders, but while this arrangement is well suited for the purpose, it is to be understood that under certain conditions I may use more than a single unit and more or less than five cylinders.

Since the cylinders are all alike, a description of one of them will answer for all. Each cylinder comprises a circular disk, such as 11, which is bored at right angles to its axis so as to form a cylinder bore 12, in which the piston 4 is adapted to reciprocate. A piston rod 13 passes through a combined stuffing box and piston guide 14, and is connected at one end to the piston 4, and at the other end to the crank pin 9 by means of an enlargement on the end of the piston rod which is located in a flanged groove formed around the crank pin and kept in place by a flanged disk 15, the latter being provided with a squared hole which registers with a corresponding square 98 formed on the end of the crank pin, and this disk is rigidly secured to said pin by a series of screws 99 or other suitable fastening which prevents any relative movement therebetween. The object of this construction is to prevent a pressure from one piston rod end to be transmitted to another piston rod end through the disk 15 and thereby avoid any cramping of the rod ends between the disk and crank pin. The cylinder disk 11 is surrounded for the greater part of its circumference by a bushing 16, which is carried by a circular web 17 formed in the casing 18. A rectangular port 19 is cored in the disk 11, and leads from the upper end of the cylinder bore 12 to a point on the periphery of the disk at substantially 90° from the axis of the cylinder bore. Stationary ports 20 and 22 are located in the web 17 and bushing 16, and are adapted alternately to register with the cylinder port 19 as the disk 11 oscillates. The port 20 communicates with a chamber 21, which is one of a series of inter-connected chambers 21 in the casing, while the port 22 communicates with a chamber 23, which is, in like manner, one of a series of inter-connected chambers 23. The lower end of the cylinder bore 12 is connected by a port 24 cored in the cylinder disk 11, and adapted alternately to register with the co-acting stationary ports 25 and 26, in the bushing and web 16; the said stationary ports leading into the chambers 21 and 23, respectively. The interconnected chambers 21 are adapted to receive fluid under pressure, while the interconnected chambers 23 are utilized to carry off the exhaust from the working cylinders, or when it is desired to reverse the direction of rotation of the motor, these connections are reversed so that pressure is supplied to the chambers 23 while the chambers 21 are connected with the exhaust. At the stuffing box end of each cylinder is a small port 27, in the disk, which communicates with one end of the cylinder bore, and a pocket 28 formed in the cylinder disk adjacent the bushing 16. A similar port 29 connects the port 24 with a similar pocket 30, the said pockets 28 and 30 being of equal dimensions and area, and symmetrically disposed on either side of the cylinder bore. These ports 27 and 29 and the pockets 28 and 30 are for the purpose of balancing the fluid pressure to which the cylinder disk is subjected and the manner in which this is effected will be pointed out later in connection with the description of the operation.

The casing 18, together with the end plates 31 and 32 are firmly secured together by means of the bolts 33. The crank shaft 10 is overhung from the roller bearing 34 in the head 31 and is supported further in roller bearings 35 in the bearing pedestal 37. The driven element comprises a cable sheave 36 which is keyed to the crank shaft and is adapted to receive the hoisting cables of an elevator or other hoist, although if desired the sheave 36 may be replaced by a belt pulley or gear or other device whereby power may be transmitted from the crank shaft to any desired power consuming device.

The operation of the motor herein described is as follows: Assuming that the interconnected chambers 21 are supplied with a fluid under pressure and that the crank shaft be rotated slightly in a counterclockwise direction, so as to move the crank off of dead center with respect to the piston 4. The crank end of the piston rod 13 together with the cylinder disk 11 will follow the crank pin and in so doing will carry the port 19 into register with the port 20, and the cylinder port 24 into register with the port 26, so that the upper side of the piston 4 will be subjected to fluid pressure from the chamber 21, while the lower side of the piston will be open to the interconnected exhaust chambers 23. The pressure acting on top of the piston 4 will exert a turning effect on the crank shaft 10. As soon as the crank shaft has turned through 180°, or a half revolution, the piston 4 will have reached the end of its stroke and a further rotative movement of the shaft will rock or oscillate the cylinder disk 11 so that the ports 19 and 24 in the disk register with the stationary exhaust and supply ports 22 and 25, respectively. Fluid pressure now enters the opposite end of the cylinder bore 12 and drives the piston in a reverse or upward direction, the upper end of the cylinder bore being open to the exhaust chambers 23 through the ports 19 and 22.

The operation of all of the other cylinders is exactly similar to that just described, the arrangement of ports being such that a substantially constant torque is exerted by the various pistons upon the crank pin, to effect a counter-clockwise rotation of the crank shaft 10.

It will be observed that when pressure is acting upon the top of the piston 4, it is also acting upon the bushing 16, so that there is no pressure whatever tending to produce friction between the cylinder disk and the bushing 16, surrounding it. When pressure enters the port 24 and acts upon the lower surface of the piston, the pressure also acts upon the combined stuffing box and piston rod guide 14, tending to move it and the cylinder disk in a direction opposite to that of the piston and toward the crank-shaft. It is the function of the pockets 28 and 30 in connection with the ports 27 and 29, respectively, to compensate or balance this pressure, and the pockets are of such size and so designed that this tendency is exactly counterbalanced. It is evident that when pressure is admitted to the lower end of the cylinder bore 12, this pressure finds its way through the ports 27 and 29, and into the pockets 28 and 30, respectively. As these pockets are similarly disposed about the axis of the cylinder bore regardless of the angularity of the crank shaft, any pressure introduced simultaneously into both pockets exerts a resultant pressure tending to carry the cylinder disk upwardly or away from the crank shaft, the direction of said resultant pressure acting always along a line which coincides with the axis of the cylinder bore. By this arrangement I am enabled absolutely to balance each and every cylinder disk against fluid pressure, so that there will be practically no friction between the oscillating cylinders and their surrounding bushings, regardless of fluid pressure conditions and speed.

It will be further observed that each piston exerts a driving force on the crank pin in a straight line, and as the motor is perfectly balanced against fluid pressure, the efficiency will be unusually high. The exchange of ports from pressure to exhaust and vice versa, takes place just when the crank shaft passes the dead center for each cylinder, and this exchange provides a quick opening of the ports just at the time when a minimum amount of fluid is taken in or exhausted from the cylinders, which is of substantial practical value, particularly where the motor fluid is of an incompressible nature such as water or oil, since it prevents any choking action due to a restricted flow of fluid to and from the cylinders and thereby permits of high piston speeds.

The pump comprises a cylindrical casing 38 which is bolted to the head 32 of the motor, and a pump shaft 39 which extends through the center of the casing in alinement with the motor shaft 10 and rotates in the ball bearings 40 and 41, carried in the valve chamber heads 42 and 43, respectively. The pump casing contains a plurality of cylinders 44, symmetrically disposed about the shaft 39 and in axial alinement therewith. In each cylinder is a single acting piston or plunger 45, and since these plungers are all alike and operate in a similar manner, a description of one of them will answer for all. Each plunger is flattened at one end on diametrically opposite sides and to this flattened portion 46 is secured a yoke 48 by means of a pin 47 or other suitable fastening. The yoke 48 is carried by a disk or tilting head 50 and is bushed therein by a removable anti-friction bushing 49 in which the yoke has a small sliding movement. The disk or tilting head 50 is carried upon the shaft 39 in anti-friction bearings comprising a pair of hardened steel collars 51 and 52 with bearing balls in between. The lateral face of the collar 52 as well as the adjacent contacting portion of the tilting head is spherical in form so that the tilting head may be tilted upon the collar 52 without tending to displace the latter. The right hand end of the tilting head is provided on its inner circumference with a hardened steel ball race 53 which is secured in place by means of a ring 54 and a co-acting ball race 55 carried by a ring 62, which is concentric with the shaft 39 in Fig. 2, but is adapted to be shifted in an eccentric position with respect to the shaft by means of a sliding key or wedge 56. The latter is arranged to slide longitudinally in a slot in the shaft by means of a lever 58 which is bifurcated at its lower end and has a pair of oppositely disposed pins which enter a circumferential groove in the part 57 which is integral with the key or wedge 56. This construction enables one to slide the wedge lengthwise of the shaft by means of the lever 58, and thereby vary the eccentricity of the ring 62 from zero to a maximum in either direction, whether the shaft be rotating or not.

From Figs. 3 and 4 it will be seen that I have shown fourteen pistons or plungers all of which are operatively connected to the tilting head and are reciprocated thereby in the following manner: When the pump shaft is rotated, for example by the electric motor M, with the tilting head in axial alinement with the shaft as seen in Fig. 1, all of the plungers stand perfectly still. If, however, the wedge be moved, for example, to the left, as shown in Fig. 9, so as to move the ring 62 out of its concentric position and into an eccentric position, so as to tilt the head 50 about the shaft, and the latter be rotated, it will be observed that an oscillating or wabbling movement will be imparted to the tilting head to effect the reciprocation of all of the plungers in their respective cylinders. The length of stroke of the plungers will obviously depend upon the amount of tilt or inclination given to the tilting head by means of the wedge, and since this factor may be varied at will, the length of stroke of the plungers and consequently the output of the pump may be controlled within predetermined limits or, if desired, the pump may be arranged to reverse the direction of flow of fluid by moving the wedge in a right hand direction past center.

In order properly to direct the fluid between the pump and the motor I provide a rotary valve which is operated from the pump shaft and arranged to have a sliding movement thereon. This valve is shown to advantage in Figs. 3, 5, 6 and 7, and comprises a sleeve 63, which is slidably mounted upon the shaft and arranged to rotate therewith by reason of a feather 64 which is located in a keyway cut in both the sleeve and shaft. This sleeve is integral with the rotary cylindrical valve which comprises the two end portions 64 and 65, and a middle portion 66. These end portions do not perform the function of directing the fluid from the pump to the motor as this is done by the middle portion 66, the end portions acting in the nature of balancing members during the operation of the pump, so that the valve will not be subjected to end thrust under pressure of fluid. A web 67 connects the valve portions 66 and 65 and it is this web that separates the pressure side of the pump from the exhaust side as clearly shown in the diagrammatic view in Fig. 10. The rear portion of the valve chamber 66 of Figs. 1, 8 and 9 or the right hand portion as shown in Fig. 5, is hollow, and as shown in the sectional view Fig. 6 taken on the line 6—6 of Fig. 5, represents in form the letter D. The valve chamber is arranged closely to fit the periphery of the valve and is lined by a non-corrodible bushing or sleeve 68 (see Fig. 8) which is preferably made of brass or bronze. The exhaust chambers 23 of the motor are all connected to a common chamber or passage 69 which is continuous and extends completely around the valve chamber. The pressure chambers 21 of the motor are in like manner all connected to a common chamber or passage 70, which is continuous and also extends completely around the valve chamber. Each pump cylinder 44 has its own individual port or passage 71 all of which lead into the valve chamber through corresponding ports cut in the valve chamber bushing 68.

Referring to Fig. 8, it will be observed that when the lowermost piston 45 is moved forward in the cylinder 44 and compresses the fluid therein, the fluid under pressure passes through the passage or port 71, through the valve passage 73 and into the passage 70, which as before pointed out is in communication with the series of pressure chambers 21 of the motor. The fluid is exhausted from the motor into the interconnected exhaust chambers 23 from whence it flows through the passage 69 and into the valve between the valve members 64 and 66. This part of the valve is in communication through the D shaped passage 74 of the valve with the port 71 which leads into the cylinder of the uppermost piston 45. From this it is seen that the lowermost piston of the pump is supplying fluid under pressure to operate the motor while the uppermost piston of the pump effects a suction which is supplied with fluid from the exhaust side of the motor.

Since the pistons and rotary valve are driven from the same shaft they must always operate in synchronism, and there is no possibility of the valve ports being rotated out of proper relation to the pistons. While the above description accounts only for two of the pistons diametrically opposite each other, the operation of the remaining pistons is exactly similar, and since the valve is divided by partitions or webs arranged 180° apart, it follows that one half of the pistons will be operating as pressure pistons for supplying the motor with fluid under pressure, the other half of the pistons will be moving in a reverse direction, and acting as suction pistons which handle the exhaust fluid from the motor. This is shown very clearly in Fig. 10, the shaded portion of the figure representing fluid under pressure from seven of the pistons upon one half of the valve, while the other seven pistons are acting as exhaust pistons with the other half of the valve under suction. The pressure of the fluid from the seven pressure pistons is represented in this figure by the arrows, and acts against the eccentric ring 53 and through the ball bearings to the eccentric ring 62, which is held in its eccentric position by the wedge 56 as before pointed out. The direction of the resultant pressure may be represented by the broken line 75 which is substantially at right angles to the direction of movement of the wedge 56, which illustrates graphically that substantially no pressure is placed upon the wedge in a direction to cause it to shift its position during the operation of the pump from the position to which it was first moved.

Fig. 11 further illustrates the action of fluid pressure upon a pair of pistons diametrically opposite each other. The upper piston in this case is under pressure, which reacts through the piston to the member 48′ which corresponds to the yoke 48 of the other figures, and the member 62′ which corresponds to the eccentric ring 62, and the action of the fluid pressure acting through these parts exert a pressure through the key or wedge to the shaft in a direction represented by the arrow 76.

Another feature of the pump which is clearly shown by the illustration of Fig. 10, is that the shifting of the eccentric may be effected at any time with little or no effort and without any possibility of a fluid lock. For instance, assuming the conditions shown in this figure, it is obvious that if the wedge 56 be shifted so as to lessen the eccentricity of the rings 62 and 53, the tilting head will be rocked about a center line which substantially coincides with the broken line 75. In other words one half of the pistons under pressure will move in one direction, while the other half of the pistons under pressure will be moved in a reverse direction, and while this movement of the pistons effected by the shifting of the wedge will set up a movement in the fluid, the latter offers no resistance to said movement of the pistons, since the valve will always be in a position to permit a free intercourse of fluid between all of the pistons under pressure. The same reasoning holds true with respect to the pistons under suction, in each case the valve prevents any fluid lock. This the figure clearly shows.

It will be seen from an inspection of Figs. 1, 8 and 9, that not only has the valve a rotary motion, but provision is also made to impart a sliding movement of the valve upon the shaft. Fig. 8 for instance shows a grooved collar 77, which surrounds the valve sleeve 63 and is provided on either lateral face with ball thrust bearings which are secured to or carried upon the valve. A pivoted lever 78 has a pin on it which rides in the groove on said collar, and the arrangement is such that the valve may be shifted longitudinally of the shaft by means of the lever 78. The latter is provided with a pin 83 at its other end, and which pin is adapted to ride in a cam slot 79 formed in the cam 80. The lever 58 by which the wedge 56 is shifted, is in like manner provided with a pin 59, which rides in a cam slot 61 in the cam 60, while both the cams 60 and 80 are secured to a shaft 81 which may be rotated by the hand sheave 82 or at a distant point by means of a cable associated with the sheave 82. The groove 79 in the cam 80 is of such shape that the slightest rotary movement of the cam effects a shifting of the valve by the lever 78. The groove 61 in the cam 60 is of different shape, the middle portion of the cam slot lying in a plane perpendicular to the axis of the cam for an appreciable distance, so that when the pump is at a zero or no-stroke position as shown in Fig. 1, any rotation of the cams will effect first a shifting of the valve and thereafter a shifting of the wedge 56 to vary the pump stroke. On the other hand, if the pump is at work, and the cams be rotated to a zero stroke position, the pin 59 will reach the perpendicular portion of the cam groove 61 and come to rest before the valve has been shifted to its limit of motion or into a fluid lock position. With this arrangement one is enabled simultaneously to vary the stroke of the pump pistons and shift the valve, and the cam slots are so proportioned that the valve can never be shifted to a position whereby the fluid from the pump can be unduly restricted or locked.

Fig. 8 shows the pump in full operation, with the pump stroke at a maximum. Fig. 9 shows the pump operating with a shorter stroke, and lesser fluid output, the inclination of the tilting head being lessened by the movement of the lever 58 in a left hand direction, while the valve has been shifted longitudinally of the shaft in a left hand direction, but not an amount sufficient to choke or restrict the diminished flow of fluid from the pump pistons operating under a shortened stroke. Fig. 2 shows the tilting head in vertical position, with the stroke of the pump pistons reduced to zero or without any reciprocating movement whatever, while the valve has entirely closed up the motor passages 69 and 70, to the valve chamber, and the fluid is locked in the motor and acts as a brake for the latter.

In case the motor be operating under a heavy load and the valve be quickly shifted to braking position as shown in Fig. 1, the sudden locking of the fluid within the motor might occasion an excessive or dangerous pressure and to guard against this, I have provided the motor with relief valves 2 and 3 which will operate under a predetermined high pressure to permit the fluid locked in the motor chambers 21 and 23 to circulate from the pressure chambers to the exhaust chambers, or vice versa, and thereby prevent abnormal pressures. Under normal operating conditions these valves remain closed at all times.

One feature of the invention which has not as yet been touched upon, and which I consider of substantial practical importance, lies in the novel method of balancing the rotary valve against the action of fluid under pressure at all times and in every direction. In Figs. 3 and 5, it will be seen that the periphery of the valve member 65 and the adjacent periphery of the valve member 66 is grooved all around except for the diametrically disposed portions 84 upon each valve member, the grooves in the valve member 65 being designated by 85 and 86, while the corresponding grooves in the valve member 66 being designated by 87 and 88, respectively. A small port 89 connects the valve passage 91 with the groove 88, while a similar port 90 connects the valve passage 92 with the groove 87. In like manner similar ports 95 and 96 on the valve part 65 connect the groove 85 with the port 94 and the groove 86 with the port 93. If the valve port 94 is under pressure from the pump, this pressure will act upon the web 67 and tend to move the entire valve in a left hand direction. But it will be observed that pressure from the valve port 94 has access through the ports 95 and 97 to the grooves 85 and 87, respectively, and the pressure admitted to these grooves will tend to move the valve in a right hand direction or in an opposite direction to that caused by the fluid acting upon the web 67. By properly proportioning the area of these grooves, the pressure on the valve as well as the weight of the valve itself may be exactly counterbalanced so that the valve will float, as it were, and rotate freely in the valve chamber without any friction from fluid pressure or from pressure due to the weight of the valve on the valve lining.

In order to reverse the direction of rotation of the motor, it is merely necessary to reverse the action of the pump by means of the hand wheel, whereby the wedge may be shifted to the right from center position, so that what was formerly under pressure is now under suction, and vice versa. This is effected through the reverse cam 61, the cam 80 acting the same regardless of its direction of rotation.

Any number of motor and pump cylinders may be used, and I have shown a five cylinder motor and a fourteen cylinder pump since I have found that that arrangement is very satisfactory both as regards the mechanical structure and capacity of the device. With a fourteen cylinder pump, at least seven cylinders will be compressing while seven are under suction, except for the instant when one pair of pump pistons is passing the dead center or having their direction of movement reversed. The fluid used in the transmission device may be water, oil or any other suitable fluid, but I prefer to use oil, since the same will keep all moving parts thoroughly lubricated and render unnecessary the use of any auxiliary lubricating means such as oil or grease cups, etc.

The transmission device herein disclosed is particularly adapted for great power and capacity and will operate quietly without vibration and with a uniform torque free from impulses. The motor used to drive the pump shaft may be of any desired type and may operate at a constant or variable speed in either direction, and the driven element or shaft 10 may be used to operate any desirable mechanism in either direction at a speed which may instantly be varied from zero to a maximum or to any desired intermediate speed.

I wish not to be limited to the particular construction herein set forth, as various changes in the details of construction and arrangement of parts might obviously be made without departing from the spirit and scope of the invention.

What I claim as new and desire to have secured by Letters Patent of the United States is:—

1. A driving member and a driven member, a power transmission device interposed between said members, said device comprising a fluid pressure motor having a plurality of oscillating cylinders radially disposed about the driven member, pistons in the cylinders connected with the driven member, a pump operated by the driving member and means comprising a rotary valve for directing fluid from the pump to the motor cylinders.

2. A driving member and a driven member, a power transmission device interposed between said members, said device comprising a fluid pressure motor having a plurality of oscillating cylinders radially disposed about the driven member, pistons in the cylinders connected with the driven member, a pump operated by the driving member and means comprising a rotary valve driven by the said driving member for directing fluid from the pump to the motor cylinders.

3. A driving member and a driven member, a power transmission device interposed between said members, said device comprising a fluid pressure motor having a plurality of oscillating cylinders radially disposed about the driven member, pistons in the cylinders connected with the driven member, a pump operated by the driving member, and means comprising a balanced rotary valve operated from the driving member for directing fluid from the pump to the motor cylinders.

4. A driving member and a driven member, a power transmission device interposed between said members, said device comprising a fluid pressure motor having a plurality of oscillating cylinders radially disposed about the driven member, pistons in the cylinders connected with the driven member, a pump operated by the driving member, and means comprising a rotary valve balanced in all directions against fluid pressure and rotated from the driving member, whereby fluid from the pump is directed to the cylinders of the motor.

5. A driving member and a driven member, a power transmission device interposed between said members, and comprising a fluid pressure motor having a plurality of oscillating cylinders radially disposed about the driven member, pistons in the cylinders connected with the driven member, a reciprocating piston pump having stationary cylinders and operated by the driving member, a rotary valve operated from the driving member for directing and controlling the amount of fluid from the pump to the motor cylinders, and means for varying the output of the pump independently of the driving member by varying the piston stroke.

6. A driving member and a driven member, a power transmission device interposed between said members and comprising a fluid pressure motor having a plurality of oscillating cylinders radially disposed about the driven member, pistons in the cylinders connected with the driven member, a multiple piston pump having stationary cylinders and operated by the driving member, member for directing and controlling the a rotary valve operated from the driving amount of fluid from the pump to the motor cylinders, and means for regulating the length of piston stroke for varying the fluid output of the pump independently of the driving member.

7. A driving member and a driven member, a power transmission device interposed between said members and comprising a fluid pressure motor having a plurality of double acting oscillating cylinders radially disposed about the driven member, pistons in the cylinders connected with the driven member, a multiple piston pump having stationary cylinders and operated by the driving member, a rotary valve operated from the driving member for directing and controlling the amount of fluid from the pump to the motor cylinders, and means for varying the length of stroke of the pump pistons independently of the driving member.

8. A driving member and a driven member, a power transmission device interposed between said members and comprising a fluid pressure motor having a plurality of oscillating cylinders radially disposed about the driven member, pistons in the cylinder connected with the driven member, a pump operated by the driving member and comprising a plurality of reciprocating pistons axially disposed about the driving member, stationary cylinders for the pistons, means for directing fluid from the pump to the motor, and means for simultaneously varying the length of stroke of all of the pump pistons independently of the said driving member.

9. A driving member and a driven member, a power transmission device interposed between said members and comprising a fluid pressure motor having a plurality of oscillating cylinders radially disposed about the driven member, pistons in the cylinders connected with the driven member, a pump operated by the driving member and comprising a plurality of reciprocating pistons axially and symmetrically disposed about the driving member, stationary cylinders for the pistons, means for directing fluid between the pump and motor, and means for varying the length of stroke of the pump pistons independently of the said driving member.

10. A driving member and a driven member, a power transmission device interposed between said members, and comprising a fluid pressure motor having a plurality of oscillating cylinders radially disposed about the driven member, pistons in the cylinders arranged to operate upon the driven member, a pump operated by the driving member and comprising a plurality of reciprocating pistons, stationary cylinders for the pistons, a rotary valve operated by the driving member for directing fluid between the pump and motor, and means comprising an oscillating disk driven from the driving member, for effecting the operation of the pump pistons.

11. A driving member and a driven member, a power transmission device interposed between said members, and comprising a fluid pressure motor having a plurality of oscillating cylinders radially disposed about the driven member, pistons in the cylinders arranged to operate upon the driven member, a pump operated by the driving member and comprising a plurality of reciprocating pistons, stationary cylinders for the pistons, means for directing fluid between the pump and motor, means comprising a disk inclined with respect to the driving member and oscillated thereby to effect the reciprocation of the pump pistons, and means for varying the inclination of said disk to control the length of stroke of the pump pistons and thereby vary the output of the pump.

12. A driving member and a driven member, a power transmission device interposed between said members, and comprising a fluid pressure motor having a plurality of oscillating cylinders radially disposed about the driven member, pistons in the cylinders arranged to operate upon the driven member, a pump operated by the driving member and comprising a plurality of reciprocating pistons, means for directing fluid between the pump and motor, means comprising a non-rotary disk inclined with respect to the driving member and oscillated thereby, a driving connection between the pistons and disk, and means for varying the inclination of said disk to alter the length of stroke of the pump pistons and thereby control the output of the pump and the operation of the motor.

13. A driving member and a driven member, a power transmission device interposed between said members comprising a fluid pressure motor connected with the driven member and a pump connected with the driving member, a rotary valve driven from the pump shaft for directing fluid between the motor and pump, and means for controlling said valve to effect a locking of fluid in said motor to maintain the latter against movement.

14. A driving member and a driven member, a power transmission device interposed between said members comprising a fluid pressure motor connected with the driven member and a pump connected with the driving member, a rotary valve driven from the pump shaft for directing fluid between the motor and pump, means for controlling said valve to effect a fluid lock in the motor to maintain the latter against movement, and means for preventing an abnormal pressure in said motor.

15. A driving member and a driven member, a power transmission device interposed between said members and comprising a fluid pressure motor connected to operate the driven member, a pump operated by the driving member, a rotary valve operated from said driving member and adapted to direct fluid between the pump and motor, and means for moving said valve into a position to cut off the passage of fluid between the pump and motor to effect a brake action upon the latter.

16. A driving member and a driven member, a power transmission device interposed between said members and comprising a fluid pressure oscillating cylinder motor connected to operate the driven member, a pump operated by the driving member, means for controlling the output of the pump independently of the driving member, a valve adapted to direct fluid between the pump and motor, and means for simultaneously controlling the said valve and pump controlling means to effect the control of the motor.

17. A driving member and a driven member, a power transmission device interposed between said members and comprising a fluid pressure motor connected to operate the driven member, a pump operated by the driving member, a rotary valve operated from said driving member and adapted to direct fluid between the pump and motor, means for moving said valve into a position to cut off the passage of fluid between the pump and motor to effect a brake action upon the latter, and means for preventing said brake action from exceeding a predetermined amount.

18. A driving member and a driven member, a power transmission device interposed between said member and comprising a fluid pressure oscillating cylinder motor connected to operate the driven member, a pump operated by the driving member, means for controlling the output of the pump independently of the driving member, a valve adapted to direct fluid between the pump and motor, and means comprising cams for simultaneously controlling the said valve and pump controlling means to effect the control of the motor.

19. A driving member and a driven member, a power transmission device interposed between said members and comprising a fluid pressure oscillating cylinder motor connected to operate the driven member, a pump operated by the driving member, means for controlling the output of the pump independently of the driving member, a valve adapted to direct fluid between the pump and motor, and manually controlled means comprising cams connected simultaneously to operate the said valve and pump controlling means to vary the speed and direction of rotation of the motor.

20. A variable speed fluid power transmission device comprising a pump and fluid pressure motor, and a single means comprising a rotary valve driven from the pump shaft adapted to direct fluid between the pump and motor during the operation of the device and to lock the fluid in the motor to effect a brake action on the latter.

21. A variable speed fluid power transmission device comprising a pump and fluid pressure motor, and a rotary valve for directing fluid between the pump and motor and adapted bodily to be moved into a position to prevent a circulation of fluid between the pump and motor to effect a brake action on the motor.

22. A variable speed fluid power transmission device comprising a pump and fluid pressure motor, and a rotary valve for distributing fluid from the pump to the motor adapted to be moved into a position to shut off the circulation of fluid.

23. A fluid pressure power transmitting device comprising a pump and motor, a rotary valve for controlling the flow of fluid between said pump and motor, and means for simultaneously operating said valve to restrict the circulation of fluid and varying the length of stroke of the pump.

24. A fluid pressure power transmitting device comprising a variable stroke pump and a fluid pressure motor connected therewith, a rotary valve adapted to direct fluid between the pump and motor and to lock the fluid in the motor, and means simultaneously to control the said valve and stroke of the pump.

25. A fluid pressure power transmitting device comprising a variable stroke pump and a fluid pressure motor connected therewith, a valve adapted to direct fluid between the pump and motor and to lock the fluid in the motor, and means to move said valve to locking position and to control the length of stroke of the pump from maximum to zero, the arrangement being such that the stroke of the pump is reduced to zero before the fluid can be locked in said motor.

26. A driving member and a driven member, a fluid pressure power transmission device interposed between said members comprising a motor and multiple piston pump, an oscillating non-rotary disk actuated from said driving member and adapted to effect a reciprocation of said pump pistons, and means for shifting the position of said disk to vary the length of stroke of said pistons without setting up a fluid pressure in said pump cylinders.

27. A driving member and a driven member, a fluid pressure power transmission device interposed between said members comprising a motor and multiple piston pump, an oscillating non-rotary disk actuated from said driving member and adapted to effect a reciprocation of said pump pistons, a valve for directing fluid from the pump to the motor, and means for shifting the position of said disk to vary the length of stroke of said pistons, said valve being in a position to permit said shifting without any opposing action being set up in the fluid.

In testimony whereof, I have signed my name to this specification in the presence of two subscribing witnesses.

AUGUST SUNDH.

Witnesses:
  JAMES G. BETHELL,
  WALTER C. STRANG.